T. L. & T. J. STURTEVANT.
CONTROLLING DEVICE FOR MOTOR VEHICLES.
APPLICATION FILED AUG. 8, 1907.
910,432.
Patented Jan. 19, 1909.
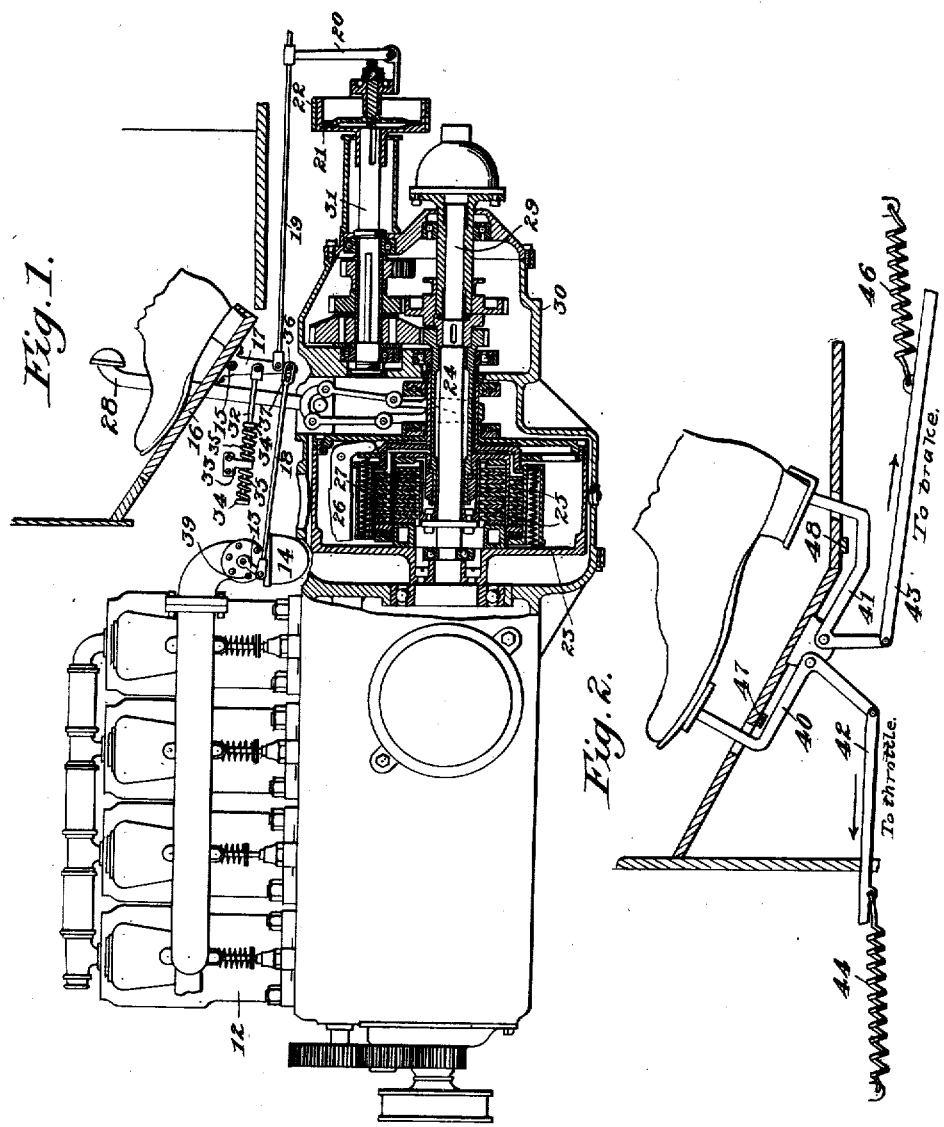

UNITED STATES PATENT OFFICE.

THOMAS LEGGETT STURTEVANT, OF QUINCY, AND THOMAS JOSEPH STURTEVANT, OF WELLESLEY, MASSACHUSETTS.

CONTROLLING DEVICE FOR MOTOR-VEHICLES.

No. 910,432.　　　Specification of Letters Patent.　　　Patented Jan. 19, 1909.

Application filed August 8, 1907. Serial No. 387,708.

*To all whom it may concern:*

Be it known that we, THOMAS L. STURTEVANT and THOMAS J. STURTEVANT, citizens of the United States, residing, respectively, at Quincy and Wellesley, in the county of Norfolk and State of Massachusetts, have invented or discovered certain new and useful Improvements in Controlling Devices for Motor-Vehicles, of which the following is a specification, reference being had therein to the accompanying drawings.

This invention has for its object to provide a simple controlling device for motor vehicles, so that, through the medium of a heel-and-toe or double-acting pedal device, which may be operated by one foot of the driver, power may be turned on, to start the machine, and the brake be released; or, conversely, when the machine is running, the power may be shut off and the brake applied to arrest the movement of the vehicle. To this end the double-acting pedal-device is preferably connected to the power-controlling device of a motor vehicle, as the throttle arm or lever, in such a manner that by a pressure of the toe or ball portion of the foot the power may be turned on and the brake be released, and by a pressure of the heel the power may be turned off and the brake applied.

In the accompanying drawings Figure 1 is a sectional elevation illustrative of the invention in connection with a motor-vehicle hydro-carbon engine and clutch device and gearing, and Fig. 2 is a detail view illustrative of a somewhat different form of the invention from that shown in Fig. 1.

Referring to Fig. 1 of the drawings, 12 denotes a hydro-carbon or internal-combustion engine, which may be of any suitable or well-known construction, and 13 denotes the arm or lever of a power-controlling or throttle valve which regulates the supply of gaseous fuel to the engine, such gaseous fuel being supplied from a carbureter 14 which may be of any well-known construction. Suitably pivoted, as on a rod or pin 15 on the foot board of the machine, is a heel-and-toe or double-acting pedal 16 having an arm 17 connected by a rod 18 with the throttle arm or lever 13. The arm 17 is also connected by a rod 19 with a brake lever 20 by which a braking force may be applied to a brake drum or wheel 21 by means of a friction band 22.

The braking device herein partly shown is, or may be, substantially the same as that fully described in our U. S. Patent No. 838,061, granted December 11, 1906, and in which the power of a driven shaft is utilized to apply the brake, so that only a very slight amount of manual power is required in operating the brake lever.

In the mechanism herein illustrated the fly-wheel 23 is suitably connected with the crank shaft of the engine, so as to rotate therewith, the said fly-wheel normally running loose relative to the power-transmitting shaft 24, and the said fly-wheel is operatively connected with said shaft, when the vehicle is to be driven, through the medium of multiple-disk friction clutch-devices 25 which will be in frictional clutching engagement, to cause the shaft 24 to be driven, when the fly-wheel reaches a certain predetermined speed of rotation, such frictional clutch engagement being effected by weighted centrifugal levers 26 operating in opposition to clutch-releasing springs 27. This automatic clutch device is essentially the same in its principle of operation as that shown and described in our Patent No. 766,551, granted Aug. 2, 1904, although, specifically, the said clutch device is like that which is shown and described in our allowed applications, No. 353,338, filed Jan. 21, 1907, and No. 365,055, filed March 28, 1907. In this particular form of our improved clutch device there is provided a lever 28 by which the driver may control or restrain the automatic action of the clutch device, or, in other words, the automatic clutch device is supplemented by a manual-control device. The term "automatic clutch device" as employed in the claims of this case will therefore be understood to refer to a clutch device in which the clutching and unclutching operations are normally effected automatically, as by centrifugal force or otherwise, whether such automatic action be supplemented or controlled by manual action or not. Also in the form of the invention herein illustrated the power-transmitting shaft 24 is connected with the driving shaft 29 of the vehicle through a suitable change-speed and reversing gear mechanism contained within the gear box 30, and similar in construction and operation to the gearing mechanism fully described in our said Patent No. 766,551; said gearing mechanism comprising the counter-shaft 31 to which the brake wheel or drum 21 is attached.

It is preferable, although not absolutely necessary, that means should be provided for normally holding the pedal 16 in a neutral position. To this end, a rod 32 is pivotally attached at one end to the arm 17 on the said pedal, the said rod passing through a bracket or loop 33 on opposite sides of which, and interposed between nuts or collars 34 on said rod, are coil springs 35 which serve, as will be understood, to normally retain the pedal 16 in its neutral position as shown in the drawing. The arm 17 is preferably loosely connected with the throttle-lever operating-rod 18, by means of a pin 36 on said arm working in a slot 37 on said rod, so as to provide for a suitable amount of lost motion between the said arm and said rod. Also, as it is desirable not to entirely shut off the power from the engine, so that the latter may continue to run slowly when the automatic clutch device is disengaged or released, a stop-pin 39 is preferably provided to limit the closing movement of the throttle arm or lever 13, the final stopping of the engine being preferably effected by breaking the sparking circuit rather than by entirely closing the throttle valve.

In the form of our invention shown in Fig. 2 the double-acting pedal device comprises two independent bell-crank levers 40 and 41, the lever 40 being connected with the throttle arm or lever by a rod 42 and the lever 41 being connected with the brake device by a rod 43; pull-back springs 44 and 46 being preferably provided to hold the said levers in their neutral positions against stops 47 and 48, respectively. It will be understood, of course, that in connection with the form of the double acting pedal device, shown in Fig. 2, a brake and a throttle arm or lever, to which the said pedal device may be connected, as shown in Fig. 1, will be employed; and that an automatic clutch device, such as shown in Fig. 1, or its equivalent, will also preferably be employed in connection with this form of the invention.

From the foregoing it will be understood that by means of a single heel-and-toe or double-acting pedal device, requiring only one foot of the driver for its positive operation in both directions, the power may be turned on and the brake released, or, vice versa, the power may be shut off and the brake applied. If a brake device by which the braking force is to be applied by the driver be employed, this heel-and-toe pedal device will be particularly desirable, as will be understood, for the reason that a powerful braking action may be applied by the driver through the medium of the heel pressure which may be exerted; and if an automatic brake device, such as is herein partly illustrated, and by which the movement of a running shaft is to be utilized in applying the brake, this heel-and-toe or double-acting mechanism will likewise be found convenient and efficient.

We do not wish to be understood as limiting our invention to the details herein shown, as the particular forms of the engine, the clutch device or the brake device herein illustrated are not of the essence of our invention, and any well known equivalents for these features may be substituted for those herein set forth without departing from the essence of our invention, which, it will be understood, is equally applicable to motor vehicles employing steam engines or electric motors in that the pedal device might be employed for operating the power-controlling devices thereof in turning the steam, or the electric current, on or off in a manner analogous to that by which the power is turned on or off in the construction herein illustrated by opening or closing the throttle-valve of the hydrocarbon engine in connection with which we preferably apply our invention.

It will of course be understood that the term "heel-and-toe" as herein used with reference to the double-acting pedal device applies equally to the single-element pedal-device shown in Fig. 1 and the double element pedal device shown in Fig. 2 and in which latter the toe or ball portion of the foot element of the said pedal device is operative independently of the heel element of said pedal device; and it will also be understood that the term "heel-and-toe" as herein used with reference to the double-acting pedal device will mean a pedal device to which pressure may be applied by the ball portion or forward sole portion of the foot, in addition to the pressure which may be applied to the heel portion of the same foot of the driver.

Having thus described our invention we claim and desire to secure by Letters Patent:

1. In a motor vehicle, the combination with a power-controlling device and an automatic clutch device, of a brake device by which movement of the vehicle may be restrained or arrested, a heel-and-toe or double-acting pedal device, and connections between said pedal device and said power-controlling and brake devices; whereby, by the movement of one foot, the power may be turned on and the brake released, or vice versa.

2. In a motor vehicle, the combination with a power-controlling device, of a brake device by which movement of the vehicle may be restrained or arrested, a heel-and-toe or double-acting pedal device, springs for normally holding said pedal-device in a neutral position, and connections between said pedal device and said power-controlling and brake devices; whereby, by the movement of one foot, the power may be turned on and the brake released, or vice versa.

3. In a motor vehicle, the combination with a power-controlling device and an automatic clutch device, of a brake device by which movement of the vehicle may be restrained or arrested, a heel-and-toe or double-acting pedal device, springs for normally holding said pedal-device in a neutral position, and connections between said pedal device and said power-controlling and brake-devices; whereby, by the movement of one foot, the power may be turned on and the brake released, or vice versa.

4. In a motor vehicle, the combination with an engine or motor, of a power-controlling device therefor, an automatic clutch device, a brake device, and a double-acting or heel-and-toe pedal-device connected with said power-controlling and brake devices and adapted to be positively actuated in opposite directions; whereby, by the movement of one foot, the power may be turned on and the brake released, or vice versa, according to whether toe or heel pressure be applied.

5. In a motor-vehicle, the combination with an engine or motor, of a power-controlling device therefor, an automatic clutch device, a brake device, a double-acting or heel-and-toe pedal device connected with said power-controlling and brake devices and adapted to be positively actuated in opposite directions, and springs for holding said heel-and-toe pedal device in a neutral position; whereby, by the opposite movements of one foot, the power may be turned on and the brake released, or vice versa, according to whether toe or heel pressure be applied.

In testimony whereof we affix our signatures, in presence of two witnesses.

THOMAS LEGGETT STURTEVANT.
THOMAS JOSEPH STURTEVANT.

Witnesses:
W. H. ELLIS,
L. H. STURTEVANT.